Sept. 24, 1974  P. FLORJANCIC  3,837,953
METHOD AND DEVICE FOR THE MANUFACTURE OF SLIDE FRAMES
Filed Sept. 18, 1972  2 Sheets-Sheet 1

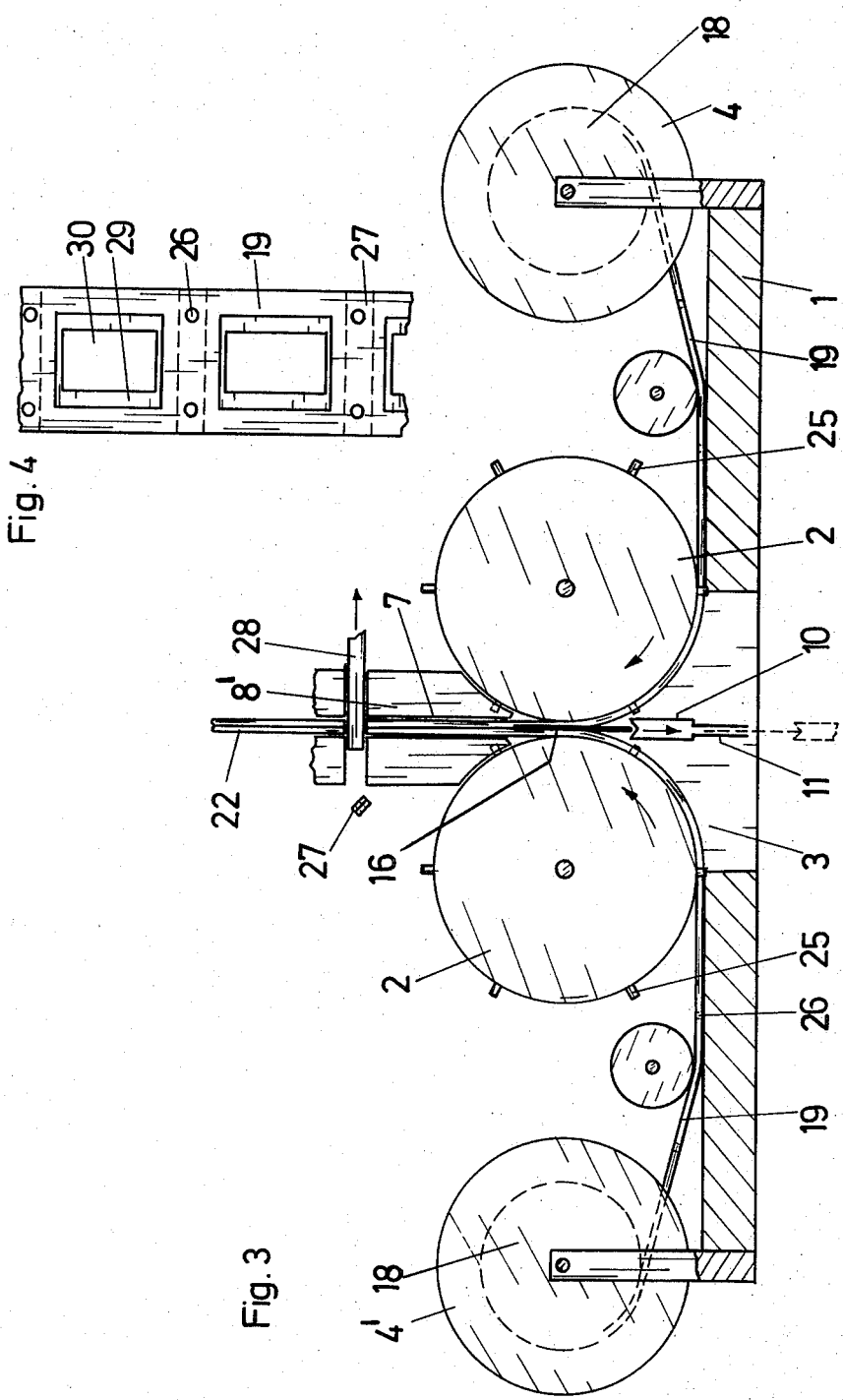

United States Patent Office 3,837,953
Patented Sept. 24, 1974

3,837,953
METHOD AND DEVICE FOR THE MANUFACTURE OF SLIDE FRAMES
Peter Florjancic, St. Martinstrasse 12, D-81 Garmisch-Partenkirchen, Germany
Filed Sept. 18, 1972, Ser. No. 289,931
Int. Cl. B32b *31/00, 31/10*
U.S. Cl. 156—108
9 Claims

ABSTRACT OF THE DISCLOSURE

The method and apparatus for the manufacture of slide frames wherein the frames constitute mask members formed as separate elements from elastically deformable material. The mask members are arranged in spaced stacks and intermittently fed toward one another to where they are engaged by rotating drums that move them over guiding prisms and into overlapping engagement with one another. A slide is fed through one of the guiding prisms and between the overlapping mask members contemporaneous with the joining of said mask members by said drums.

---

Figure 1:
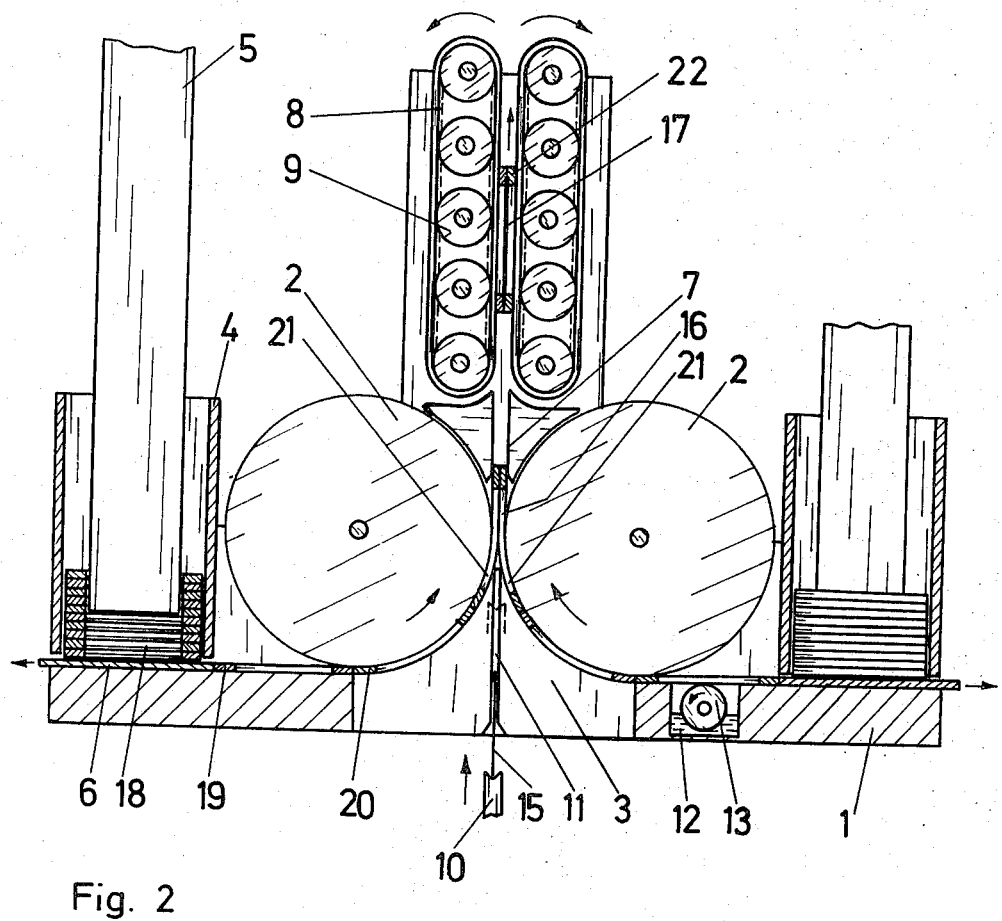

The invention relates to a method for the manufacture of slide frames comprising two masks made of elastically deformable material, with the aid of a pair of turnable drums disposed parallel to each other such that their surfaces have at the point of their nearest approach a mutual distance of at least approximately equal to the thickness of the slide frame, said point forming the framing plate, said masks being connected to each other by mechanical gripping, bonding, welding, etc. The invention also relates to a device for carrying out this method.

It is known to prefabricate two masks which are connected to each other along the edge of each one of the masks this connection being thin enough that the masks may be folded together. In this position they are fed to two pressure drums and connected thereby to a slide frame. This device requires complicated elements for the previous folding of the masks. In addition, the manufacture of the masks raises considerable difficulties because they must be made in one piece comprising a thin connecting trap.

It is the object of the invention to connect two separate masks which are preferably identical to a slide frame. In doing so, it is possible either to provide a slit for the later insertion of a slide or the slide may be inserted simultaneously with the manufacture of the frame.

The method is characterized in that each mask is conveyed to the framing place resting against the surface of one of the two drums.

It is based on the cognition that it is possible to convey the masks to the framing place in a very simple trajectory, i.e. in a part of a circle, notwithstanding the fact that the masks which normally are made of plastic have only a limited deformability. In a device according to the invention the feeding mechanism for the masks is very simple. A further advantage of the method is that the insertion of the slide can be effected at a moment when, on one hand, the masks rest against each other already partially assembled and thus formed a safe guide for the slide and, on the other hand, there is still a distance between the masks such that insertion of the slide is simple. Known devices either require separate elements for opening again a frame already closed or serious difficulties arise in centering correctly the slide.

Thereby all requirements are met which are required from devices for the manufacture of such frames. These are above all high working speed and the possibility to insert the slide simultaneously with the manufacture of the frame whereby it is of deciding importance to fix safely the slide in the right position, otherwise the perforation or parts of the slide not belonging to the picture itself become visible. This is accomplished by the method according to the invention in that the masks are conveyed to the framing place in a curved state whereby their convex surfaces facing each other form a sort of funnel in which the slide may be inserted simply and safely.

The drums may effect also the connection of the masks, particularly the masks may be pressed together by the drums at the place where they have their shortest distance from each other. Thus the proposed device is extremely simple.

As the masks may have either different normal thicknesses or vary in this respect by irregularities in manufacture it is recommendable to sustain at least one of the drums yieldable whereby it is possible either to adjust its position to the thickness of the slide or to provide a spring which effects a pressure on the masks.

If single masks are used it is recommended that they be pushed out from a magazine towards the framing place by a push rod, etc. In order to make them rest against the surface of the drum it is further proposed to provide guiding surfaces arranged concentric and at a distance to the surface of the drum. These guiding surfaces may be provided on a prismatic block or may be formed by a simple sheet metal. In this case it is not necessary to drive the drums.

If the masks are formed from an endless cartoon strip, it is proposed to provide grippers on the drums whereby the grippers are formed and placed such that they match with suitable perforations of the cartoon strip. In this case the drums preferably are driven by a motor whereby synchronization between the two drums is achieved by a suitable gear.

If single masks are fed the drums may be provided with distance rims on their surfaces. These rims extend parallel to the axes of the drums and serve to synchronize the movements of the two masks to be connected and/or to push them towards the framing place.

The invention will now be described in two embodiments without being limited to them.

Figure 2:
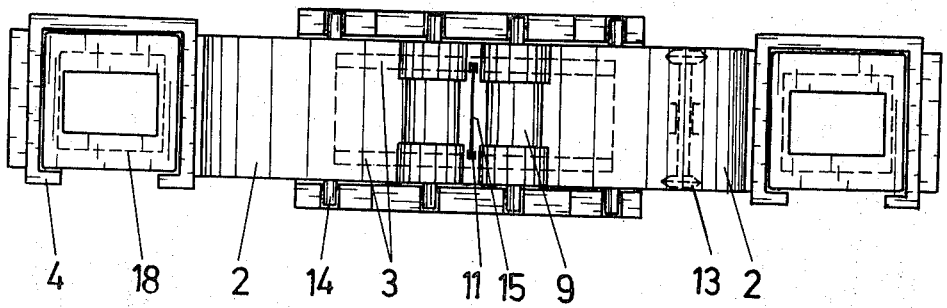

FIG. 1 shows schematically a first embodiment partially in view, partially in section, FIG. 2 is the corresponding plan elevation. FIG. 3 shows a second embodiment of the invention in the same way as in FIG. 1 but for the manufacture of cartoon frames, FIG. 4 is a plan elevation of the cartoon strip before framing.

As shown in FIG. 1 and FIG. 2, there is a base plate 1 on which two magazines 4 are placed. Each magazine 4 has the form of a chimney and is filled with masks 18 with the aid of a holder 5 in form of a bar. The masks are pushed out from these magazines 4 one by one by the periodical movements of push boards 6 and moved horizontally in direction towards each other. One of the masks 19 is wetted by rolls 13 which dip into a bath of adhesive 12. This wetting is only effected on those rims of the mask which extend parallel to the long side of the view opening.

In their further track the masks come into contact with a guiding prism 3 provided with two cylindrical surfaces bending upwards. The masks slide along these surfaces while they rest against two drums 2. As these drums are supported by bearings 14 they are driven without any considerable resistance by the masks 20.

After the masks have been deflected upwards by 90° they arrive at the framing place which is formed by the narrowest gap between the two drums 2. This gap is chosen such that the two masks contacting each other at this place can just pass.

In the diverging part of the gap above the framing place a further guiding prism is arranged. This prism has a slit 7 the width of which is slightly greater than the thickness of the finished slide frame. The lower entrance of the slit is chamferred in order to introduce safely the leading edge of the slide frame.

In the embodiment shown the device is further equipped with a treating device comprising circulating tapes 8 which are guided and driven by rolls 9 in such a way that the slide frame is gripped between them and conveyed upwards under a certain pressure. Thereby the two masks are bonded together safely. This treating device also may comprise a heating element for welding the two masks together, or a printing device which provides one mask or both masks with an imprint. Printing may also be effected by a stereotype block provided on the drums.

FIG. 1 and FIG. 2 show also that it is easily possible to insert simultaneously a slide 15 when manufacturing the frame. For this purpose the guiding prism 3 is provided with a vertical slit 11 through which the single slides 15 are fed to the framing place by a push rod 10 moving in synchronisation with the movement of the masks. Slit 11 is in the region of the perforation so small that the slide is guided safely, in the region of the picture it is enlarged in order to guarantee on one hand that the picture is not scratched and to provide on the other hand enough space for push rod 10. The highest position of this push rod is indicated in dotted lines in FIG. 1.

Preferably the push boards 6 for the masks and push rods 10 for the slide are moved alternately. Thus, first the masks 21 are brought into the position on the framing place as shown in FIG. 1, i.e. the masks have passed the narrowest gap between the drums already with about one half of each of these halves 16 contacting each other over a plane whereas the trailing halves 21 still are held apart by the guiding prism 3 and thus form a sort of funnel. The slide 15 now can be introduced between the two masks through this funnel which acts as a safe guideway and scratching of the picture is impossible. The movement of the slide continues until its leading edge has passed the end of the view opening in the part 16 of the frame which is already closed. This part of the frame also keeps the slide 15 safely in place when the push rod 10 is retracted. Now the advance of the masks 21 is continued and the slide 15 is taken with them.

FIG. 3 shows an embodiment of the invention for the manufacture of cartoon frames. Here, too, it is possible to insert slides simultaneously with the manufacture of the slide frame.

The cartoon strip as used is shown in FIG. 4. Around the view opening there is a slight depression 29 forming a lodging for the slide. In each bridge 27 between two masks 19 two holes 26 are provided. The strip is coated on one side with a contact adhesive.

In this embodiment the two magazines are formed by magazine rolls 4 and 4' on which the strip is wound. The transport of the strip is not effectuated by pushing elements but by the drums 2 themselves. For this purpose they are provided on their peripheries with gripper pins 25 which engage in the holes 26 of the cartoon strip. The two drums are driven synchronously but in opposite directions, e.g. by a toothed gear (not shown).

A treating device 8' may comprise a heater which effects or accelerates bonding of the masks. Furthermore there could be here a device which seams the frame with a bonding strip which might have an imprint.

Cutting of the cartoon strip is effectuated by a punching knife 28.

Many variations are possible within the scope of the claims. E.g., it is not necessary that the masks are conveyed along the surface of the drums over an angle of exactly 90°, this angle may be greater or smaller. Furthermore it is not indispensable the movement is intermittent; especially with cartoon frames and/or when no slides are inserted but only frames are manufactured a continuous movement can easily be realized. Even single masks may be moved by grippers provided on the drums; in this case, feeding of the masks from above is advantageous such that the contact angle between masks and drum is greater than 90°—up to about 180°. The drums need not have the same diameter over their full length, they may have a recess in the region of the view opening. It is also possible to insert cover glasses together with the slide.

It is emphasized that the expressions "upper," "horizontal," etc. used in the description refer to a device which is put in the position shown in the figures. Evidently it were possible to turn the device into another position, e.g. such that the masks are deflected downwards by the drums and/or guiding surfaces and to introduce eventually the slide from above.

What I claim is:

1. The method of manufacture of slide frames comprising providing a plurality of sources of supply of mask members, intermittently advancing a pair of mask members from said sources towards one another, guiding said pair of mask members into overlapping engagement, feeding said overlapping mask members contemporaneous with the feeding of a slide member between said overlapped mask members and receiving and guiding said overlapped mask members and slide member.

2. The method of claim 1 wherein a source of adhesive is provided for applying same to at least one of said mask members.

3. Apparatus for the manufacture of slide frames comprising a base member, a plurality of mask members arranged in stacked relation in a pair of means carried by said base member, means reciprocating on said base member for moving a mask member out of each stack and towards one another along said base member, rotatable means on said base member co-acting with one another and engageable with said mask members for moving same into overlapping engagement with one another, spaced guiding means associated with said rotatable means, one of said guiding means receiving a slide for introducing and positioning same between a pair of co-acting mask members intermediate said guiding means and means for compressing said mask members and slide to form a unitary structure.

4. Apparatus as defined in claim 3 wherein said base member is provided with a source of adhesive, means for applying said adhesive to the peripheral surface of at least one of said mask members.

5. Apparatus as defined in claim 3 wherein one of said guiding means is configured to receive said mask members on opposite faces with a slot in the central portion thereof to receive and guide said slide between said mask members.

6. Apparatus as defined in claim 3 wherein said rotatable means includes a plurality of drums carried by said base member and said guiding means each have a surface that extends approximately concentrical to the surface of said drums.

7. Apparatus as defined in claim 3 wherein a push rod is provided for moving said slide into said guiding means and between said mask members in timed relation to the reciprocatory means for moving said mask members.

8. Apparatus as defined in claim 6 wherein said drums and guiding means have heating means and pressure rollers associated therewith for receiving the mask members and slide from said guiding means.

9. Apparatus as defined in claim 3 wherein said rotatable means are provided with means for engaging said mask members.

References Cited

UNITED STATES PATENTS

| | | | |
|---|---|---|---|
| 3,453,169 | 7/1969 | Buck et al. | 156—555 |
| 3,459,609 | 8/1969 | Hairabedian et al. | 156—179 |
| 2,865,425 | 12/1958 | Byers | 156—386 |
| 3,737,359 | 6/1973 | Levitan | 156—555 |
| 2,725,155 | 11/1955 | Fitch et al. | 156—364 |
| 3,194,709 | 7/1965 | Bondhus | 156—108 |

DANIEL J. FRITSCH, Primary Examiner

U.S. Cl. X.R.

156—277, 383, 384, 549, 555, 559, 572